(12) United States Patent
Bykanov et al.

(10) Patent No.: US 7,518,787 B2
(45) Date of Patent: Apr. 14, 2009

(54) DRIVE LASER FOR EUV LIGHT SOURCE

(75) Inventors: Alexander N. Bykanov, San Diego, CA (US); Jerzy R. Hoffman, Escondido, CA (US); Igor V. Fomenkov, San Diego, CA (US); William N. Partlo, Poway, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 11/452,558

(22) Filed: Jun. 14, 2006

(65) Prior Publication Data

US 2007/0291350 A1    Dec. 20, 2007

(51) Int. Cl.
*H01S 4/00* (2006.01)
*H01S 3/22* (2006.01)
*H01S 3/223* (2006.01)

(52) U.S. Cl. .................. 359/333; 359/342; 372/55; 372/56; 372/68

(58) Field of Classification Search .......... 359/333, 359/348, 342; 372/55, 56, 68
See application file for complete search history.

(56) References Cited

U.S. PATENT DOCUMENTS

| 4,174,504 | A | * | 11/1979 | Chenausky et al. | 372/11 |
|---|---|---|---|---|---|
| 5,117,303 | A | | 5/1992 | Desurvire et al. | 359/341 |
| 5,818,630 | A | * | 10/1998 | Fermann et al. | 359/341.31 |
| 5,991,069 | A | * | 11/1999 | Jander | 359/337 |
| 6,389,045 | B1 | * | 5/2002 | Mann et al. | 372/25 |
| 6,625,191 | B2 | * | 9/2003 | Knowles et al. | 372/55 |
| 6,693,939 | B2 | | 2/2004 | Klene et al. | 372/58 |
| 6,741,627 | B2 | * | 5/2004 | Kitatochi et al. | 372/57 |
| 6,928,093 | B2 | | 8/2005 | Webb et al. | 372/25 |
| 7,079,564 | B2 | * | 7/2006 | Fallon et al. | 372/55 |
| 2005/0259709 | A1 | | 11/2005 | Das et al. | 372/55 |

FOREIGN PATENT DOCUMENTS

JP    2005167082 A    *    6/2005

OTHER PUBLICATIONS

Ariga et al, "High power pulse CO2 laser for EUV lithography", Proceedings of SPIE, vol. 6151, Emergin Lithographic Technologies X, 61513M (Mar. 24, 2006).*

(Continued)

*Primary Examiner*—Eric Bolda
(74) *Attorney, Agent, or Firm*—Matthew K. Hillman (57) ABSTRACT

A laser light source is disclosed having a laser oscillator producing an output beam; a first amplifier amplifying the output beam to produce a first amplified beam, and a second amplifier amplifying the first amplified beam to produce a second amplified beam. For the source, the first amplifier may have a gain medium characterized by a saturation energy ($E_{s,1}$) and a small signal gain ($g_{o,1}$); and the second amplifier may have a gain medium characterized by a saturation energy ($E_{s,2}$) and a small signal gain ($g_{o,2}$), with ($g_{o,1}$)>($g_{o,2}$) and ($E_{s,2}$)>($E_{s,1}$). In another aspect, a laser oscillator of a laser light source may be a cavity dumped laser oscillator, e.g. a mode-locked laser oscillator, q-switched laser oscillator and may further comprising a temporal pulse stretcher.

19 Claims, 5 Drawing Sheets

OTHER PUBLICATIONS

Yamanaka et al. "The LEKKO VIII CO2 Gas Laser System", IEEE Journal of Quantum Electronics, vol. QE 17, No. 9, pp. 1678-1688 (Sep. 1981).*

U.S. Appl. No. 11/358,988, filed Feb. 21, 2006, Bykanov et al.

U.S. Appl. No. 11/394,512, filed Mar. 31, 2006, Das et al.

Ariga, et al, "High Power and Short Pulse RF-excited $CO_2$ Laser MOPA System For LPP EUV Light Source", EUVA (*Extreme Ultraviolet Lithography System Development Association*). 1200 Manda Hiratsuka, Kanagawa, 254-8567, Japan.

Ariga et al., "High Power Pulsed $CO_2$ Laser for EUV Lithography", EUVA (*Extreme Ultraviolet Lithography System Development Asociation*). 1200 Manda Hiratsuka, Kanagawa, 254-8567, Japan (2006).

Endo, Akira, "High-Average Power EUV Light Source For The Next-Generation Lithography By Laser-Produced Plasma", *IEEE Journal of Selected Topics In Quantum Electronics*, vol. 10, No. 6, pp. 1298-1306, Nov./Dec. 2004.

Endo, Akira, "Development of Short Pulse and High Power $CO_2$ Laser For EUV Lithography", EUVA (*Extreme Ultraviolet Lithography System Development Asociation*) 1200 Manda Hiratsuka, Kanagawa, 254-8564, Japan.

Franz et al., "Theory of Pulse Propagation in a Laser Amplifier", *Journal of Applied Physics*, vol. 34, No. 8, pp. 2346-2349, (1963).

Komori, et al, "EUV Characteristics of a High Power and High Repetition Rate $CO_2$ Laser Driven Xe Plasma", EUVA (*Extreme Ultraviolet Lithography System Development Asociation*) 1200 Manda Hiratsuka, Kanagawa, 254-8567, Japan.

Mizoguchi, et al, "Development of $CO_2$ Laser Produced Xe Plasma EUV Light Source for Microlithography", EUVA (*Extreme Ultraviolet Lithography System Development Asociation*) 1200 Manda Hiratsuka, Kanagawa, 254-8567, Japan.

* cited by examiner

DRIVE LASER FOR EUV LIGHT SOURCE

The present application is related to co-pending U.S. patent application Ser. No. 11/358,988 filed on Feb. 21, 2006, entitled LASER PRODUCED PLASMA EUV LIGHT SOURCE WITH PRE-PULSE, U.S. Pat. No. 6,928,093, issued to Webb, et al. on Aug. 9, 2005, entitled LONG DELAY AND HIGH TIS PULSE STRETCHER, U.S. application Ser. No. 11/394,512, filed on Mar. 31, 2006 and titled CONFOCAL PULSE STRETCHER, U.S. application Ser. No. 11/138,001 filed on May 26, 2005 and titled SYSTEMS AND METHODS FOR IMPLEMENTING AN INTERACTION BETWEEN A LASER SHAPED AS A LINE BEAM AND A FILM DEPOSITED ON A SUBSTRATE, and U.S. application Ser. No. 10/141,216, filed on May 7, 2002, now U.S. Pat. No. 6,693,939, and titled, LASER LITHOGRAPHY LIGHT SOURCE WITH BEAM DELIVERY, the disclosures of each of which are hereby incorporated by reference herein.

FIELD OF THE INVENTION

The present invention relates to systems and methods for generating laser light which can be used for applications including, but not limited to, the irradiation of a target material to generate extreme ultraviolet (EUV) light, e.g., light at wavelengths of around 50 nm and below.

BACKGROUND OF THE INVENTION

Extreme ultraviolet (EUV) light, e.g., electromagnetic radiation having wavelengths of around 50 nm or less (also sometimes referred to as soft x-rays) and including light at wavelengths at or about 13.5 nm, can be used in photolithography processes to produce extremely small features in substrates, e.g., silicon wafers.

Methods to produce EUV light include, but are not necessarily limited to, converting a material into a plasma state that has an element, e.g., xenon, lithium or tin, with an emission line in the EUV range. In one such method, often termed laser produced plasma (LPP) the required plasma can be produced by irradiating a target material, such as a droplet, stream or cluster of material having the required line-emitting element, with a laser beam.

LPP and other high power laser applications often require a laser source meeting specific laser output requirements. These requirements may include power (or in the case of a pulsed laser—pulse energy and repetition rate), pulse duration, beam quality and wavelength. Generally, it is also desirable to optimize the initial laser cost, cost of laser operation, reliability and conversion efficiency (e.g., the ratio of EUV power output to electrical input). For example, and not by way of limitation, a particular LPP configuration, e.g., using tin targets, may operate efficiently using light at a wavelength of 10.6 μm, a pulse duration of 20-150 ns and a pulse energy of about 100 mJ.

With the above in mind, Applicants disclose systems and methods for efficiently producing laser light having the above described characteristics, together with teachings provided herein that are extendable to the design of laser sources to produce other specified laser output characteristics.

SUMMARY OF THE INVENTION

In a first aspect of an embodiment, a laser light source may comprise a laser oscillator producing an output beam; a first amplifier amplifying the output beam to produce a first amplified beam, and a second amplifier amplifying the first amplified beam to produce a second amplified beam. For this aspect, the first amplifier may have a gain medium characterized by a saturation energy ($E_{s,\ 1}$) and a small signal gain ($g_{o,\ 1}$); and the second amplifier may have a gain medium characterized by a saturation energy ($E_{s,\ 2}$) and a small signal gain ($g_{o,\ 2}$), with ($g_{o,\ 1}$)>($g_{o,\ 2}$) and ($E_{s,\ 2}$)>($E_{s,\ 1}$). The laser light source may further comprise a third amplifier amplifying the second amplified beam to produce a third amplified beam, the third amplifier having a gain medium characterized by a saturation energy ($E_{s,\ 3}$) and a small signal gain ($g_{o,\ 3}$), with ($g_{o,\ 1}$)>($g_{o,\ 2}$)>($g_{o,\ 3}$) and ($E_{s,\ 3}$)>($E_{s,\ 2}$)>($E_{s,\ 1}$).

In one embodiment, the first amplifier gain medium may comprise a gas having a first gas composition and in a particular embodiment, the second amplifier gain medium may comprise a gas having a gas composition different from the first gas composition. In one embodiment; the first amplifier gain medium may be a gas at a gas pressure $P_1$, and the second amplifier gain medium may be a gas at a gas pressure $P_2$, with $P_1 \neq P_2$. For any of the above-described embodiments, the gas may comprise $CO_2$.

In another aspect of the laser light source, the laser oscillator may be, e.g., a mode-locked laser oscillator, q-switched laser oscillator or other cavity dumped laser oscillator. In a particular embodiment, the laser light source may further comprise a temporal pulse stretcher. In one setup, the temporal pulse stretcher is positioned to receive laser pulses from the oscillator and produce stretched pulses therefrom for amplification by an amplifier.

In another aspect of an embodiment, an EUV light source may comprise a droplet generator producing droplets containing an EUV line emitting element and a laser light source for irradiating droplets to produce an EUV emission. For the EUV light source, the laser light source may comprise a laser oscillator producing laser pulses; a temporal pulse stretcher stretching laser pulses; and an amplifier amplifying laser pulses. In a particular embodiment, the amplifier may be a first amplifier amplifying pulses to produce a first amplified beam, the first amplifier having a gain medium characterized by a saturation energy ($E_{s,\ 1}$) and a small signal gain ($g_{o,\ 1}$); and the EUV light source may further comprise a second amplifier amplifying the first amplified beam to produce a second amplified beam, the second amplifier having a gain medium characterized by a saturation energy ($E_{s,\ 2}$) and a small signal gain ($g_{o,\ 2}$), with ($g_{o,\ 1}$)>($g_{o,\ 2}$) and ($E_{s,\ 2}$)>($E_{s,\ 1}$). For example, the EUV line emitting element may be tin. In a particular implementation, the laser oscillator may produce laser pulses having a pulse duration in the range of 10-30 ns and the temporal pulse stretcher may produce laser pulses having a pulse duration in the range of 50-150 ns.

Aspects of an embodiment may also include a method for generating laser light, comprising the acts and/or steps of producing a seed laser beam; amplifying the seed beam using a first gain medium to produce a first amplified beam, the first gain medium characterized by a saturation energy ($E_{s,\ 1}$) and a small signal gain ($g_{o,\ 1}$); and amplifying the first amplified beam using a second gain medium to produce a second amplified beam, the second gain medium characterized by a saturation energy ($E_{s,\ 2}$) and a small signal gain ($g_{o,\ 2}$), with ($g_{o,\ 1}$)>($g_{o,\ 2}$) and ($E_{s,\ 2}$)>($E_{s,\ 1}$).

A further aspect of an embodiment of the invention may be characterized as comprising an EUV light source having a material containing an EUV line emitting element, e.g. tin; a source of at least one laser pulse, e.g., a $CO_2$ laser; a pulse stretcher modifying the shape of the pulse to have at least three peaks, the stretcher having a beam splitter defining the relative magnitude of the peaks and a delay path establishing a temporal separation of the peaks, the modified pulse shape selected to irradiate the material and produce an EUV intensity greater than an EUV intensity generated in the absence of the pulse stretcher. In one embodiment, a first peak of the modified beam has a lower intensity than another peak of the modified beam and in a particular embodiment, one or more parameters of the first peak is selected to irradiated the material with a pre-pulse to spatially expand the line emitting element for subsequent irradiation by the second peak. In one arrangement, the pulse stretcher may be a non-displacing pulse stretcher and in a particular arrangement the pulse stretcher may place each pulse peak on a different path exiting the stretcher and the material may be in the form of droplet(s).

DETAILED DESCRIPTION OF PREFERRED EMBODIMENTS

Figure 1:
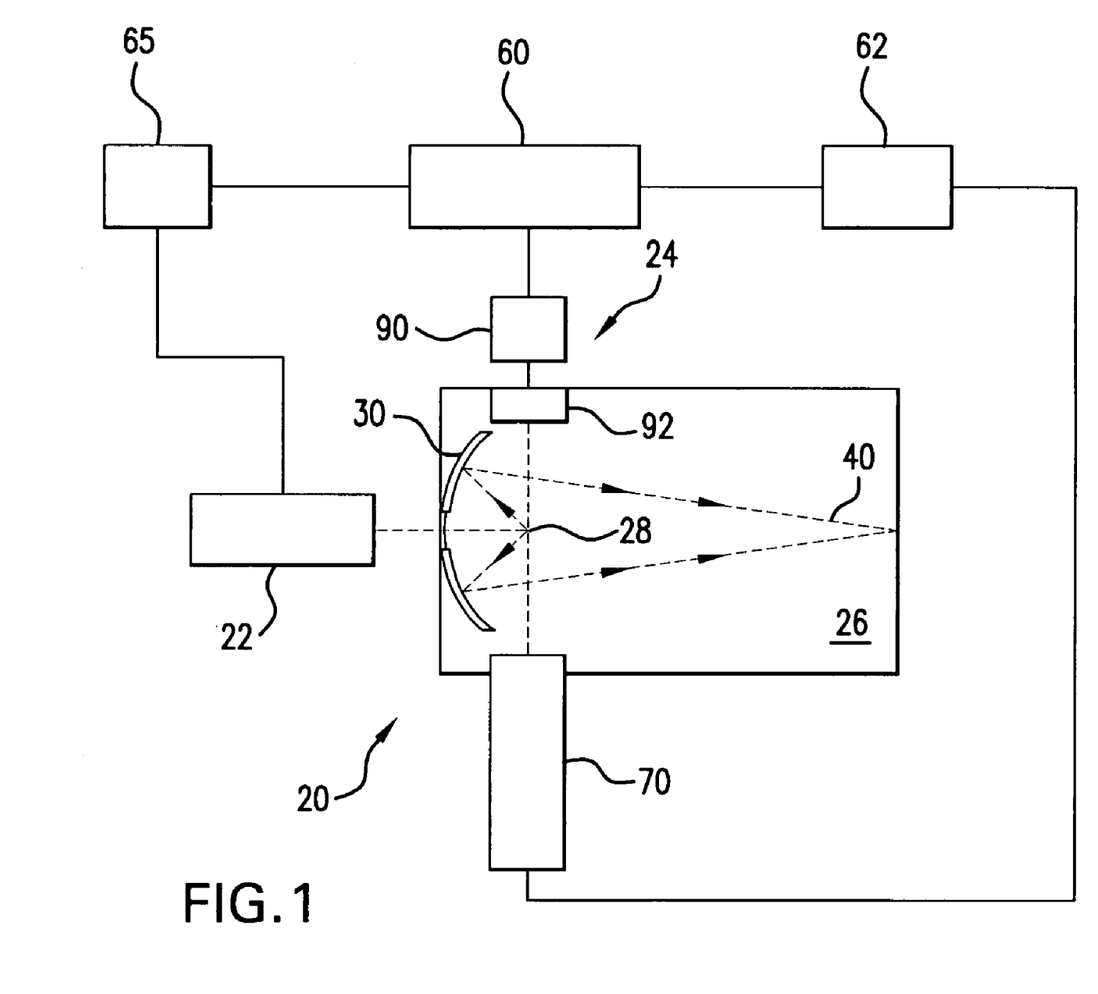
FIG. 1 shows a schematic view of an overall broad conception for a laser-produced plasma EUV light source according to an aspect of the present invention.

With initial reference to FIG. 1 there is shown a schematic view of an exemplary EUV light source, e.g., a laser produced plasma EUV light source 20 according to an aspect of the present invention. As shown in FIG. 1, and described in further detail below, the LPP light source 20 may include a source 22 for generating light pulses and delivering the light pulses into a chamber 26. As detailed below, the light pulses may travel along one or more beam paths from the source 22 and into chamber 26 to illuminate one or more target volumes.

As further shown in FIG. 1, the light source 20 may also include a source material delivery system 24, e.g., delivering droplets of a source material into the interior of a chamber 26 to a target volume 28 where the source material targets will be irradiated by one or more light pulses, e.g., a pre-pulse and thereafter a main pulse, to produce a plasma and generate an EUV emission. The source material may include, but is not limited to, a material that includes tin, lithium, xenon or combinations thereof. The EUV emitting element, e.g., tin, lithium, xenon, etc., may be in the form of liquid droplets and/or solid particles contained within liquid droplets or any other form that delivers the EUV emitting element to the target volume.

Continuing with FIG. 1, the light source 20 may also include a collector 30, e.g., a reflector, e.g., in the form of a truncated ellipse, e.g., a multi-layer mirror having alternating layers of Molybdenum and Silicon, with an aperture to allow the light pulses generated by the source 22 to pass through and reach the target volume 28. The collector 30 may be, e.g., an elliptical mirror that has a first focus within or near the target volume 28 and a second focus at a so-called intermediate point 40 (also called the intermediate focus 40) where the EUV light may be output from the light source 20 and input to, e.g., an integrated circuit lithography tool (not shown).

The light source 20 may also include an EUV light source controller system 60, which may also include a firing control system 65 for triggering one or more lamps and/or laser sources in the source 22 to thereby generate light pulses for delivery into the chamber 26. The light source 20 may also include a droplet position detection system which may include one or more droplet imagers 70 that provide an output indicative of the position of one or more droplets, e.g., relative to the target volume 28 and provide this output to a droplet position detection feedback system 62, which can, e.g., compute a droplet position and trajectory, from which a droplet error can be computed, e.g. on a droplet by droplet basis or on average. The droplet error may then be provided as an input to the light source controller 60, which can, e.g., provide a position, direction and timing correction signal to the source 22 to control a source timing circuit and/or to control a beam position and shaping system e.g., to change the location and/or focal power of the light pulses being delivered to the chamber 26.

As shown in FIG. 1, the light source 20 may include a droplet delivery control system 90, operable in response to a signal (which in some implementations may include the droplet error described above, or some quantity derived therefrom) from the system controller 60, to e.g., modify the release point of the source material from a droplet delivery mechanism 92 to correct for errors in the droplets arriving at the desired target volume 28.

Figure 2:
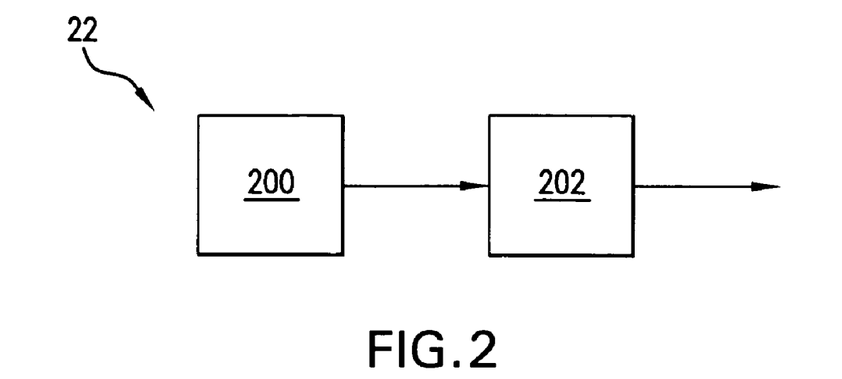
FIG. 2 illustrates one embodiment of a laser source which includes an oscillator unit and an amplification unit.

FIG. 2 illustrates one embodiment of a source 22 which includes an oscillator unit 200 and an amplification unit 202. For example, the oscillator unit 200 can include a pulsed gas discharge $CO_2$, excimer or molecular fluorine laser oscillators and the amplification unit 202 can include one or more gas discharge $CO_2$, excimer or molecular fluorine laser units configured as oscillators or single/double pass amplifiers. The laser units in the amplification unit 202 may be arranged in parallel or in series.

Figure 3:
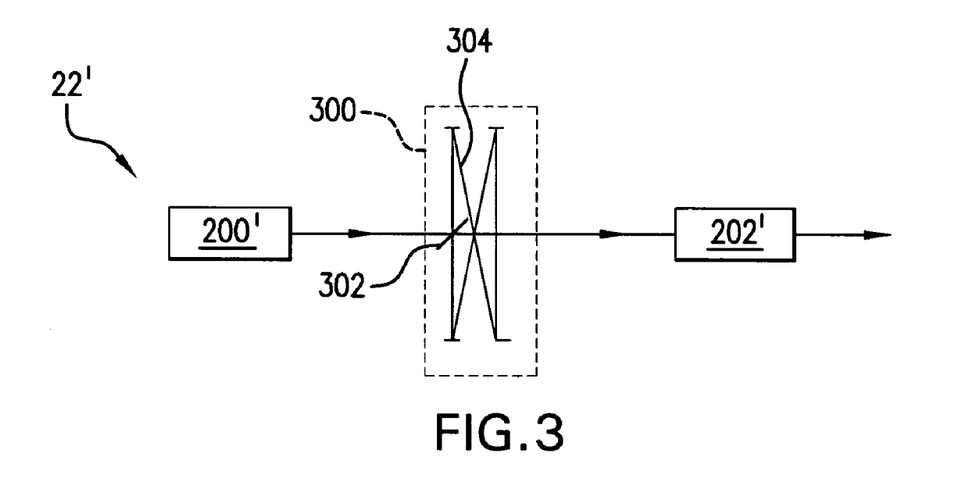
FIG. 3 illustrates another embodiment of a laser source which includes an oscillator unit, a temporal pulse stretcher and an amplification unit.

FIG. 3 illustrates another embodiment of a source 22' which includes an oscillator unit 200', a temporal pulse stretcher 300 and an amplification unit 202'. More details regarding temporal pulse stretchers may be found in U.S. Pat. No. 6,928,093, issued to Webb, et al. on Aug. 9, 2005, entitled Long Delay And High TIS Pulse Stretcher, U.S. application Ser. No. 11/394,512, filed on Mar. 31, 2006 and titled "Confocal Pulse Stretcher", U.S. application Ser. No. 11/138,001 filed on May 26, 2005 and titled "Systems and Methods for Implementing an Interaction between a Laser Shaped as a Line Beam and a Film Deposited on a Substrate", and U.S.

application Ser. No. 10/141,216, filed on May 7, 2002, now U.S. Pat. No. 6,693,939, and titled, "Laser Lithography Light Source With Beam Delivery," the disclosures of each of which are hereby incorporated by reference herein. Typically, these optical pulse stretchers include a beam splitter 302 which passes a portion of the beam along a delay path 304 allowing the pulse shape exiting the stretcher to be controlled by selecting the proper beam splitter reflectivity and delay path length. Specifically, the pulse stretcher 300 receives an input pulse generally having a single peak (i.e. in a plot of intensity vs. time) and outputs a pulse having a plurality of temporally spaced peaks. As shown, the stretcher 300 may be substantially lossless. For the case where the pulse peaks are all output on a common beam path, the pulse stretcher is herein referred to as a non-displacing pulse stretcher. For the arrangement shown in FIG. 3, the components of the stretcher 300 can be aligned such that the pulse stretcher may be non-displacing.

For the stretcher, the reflectivity of the beam splitter will impact the relative magnitude of the output peaks and the length of the delay path may establish the temporal separation between peaks. Thus, the output pulse shape can be engineered by proper selection of the beam splitter reflectivity and the length of the delay path.

Moreover, in some cases, the output pulse shape may be optimized to increase EUV output and/or conversion efficiency (i.e., the ratio of output EUV power to the EUV light source input power) and/or lower source material consumption, e.g., tin consumption, and/or reduce the formation of undesirable by-products in the plasma chamber (e.g. debris) which can potentially damage or reduce the operational efficiency of the various plasma chamber optical elements, e.g. mirrors, windows, etc.

Figure 3A:
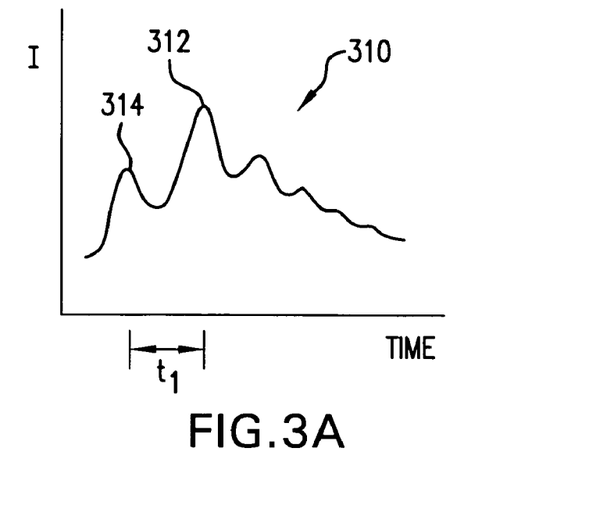
FIG. 3A illustrates a first pulse shape that may be obtained using a pulse stretcher.
Figure 3B:
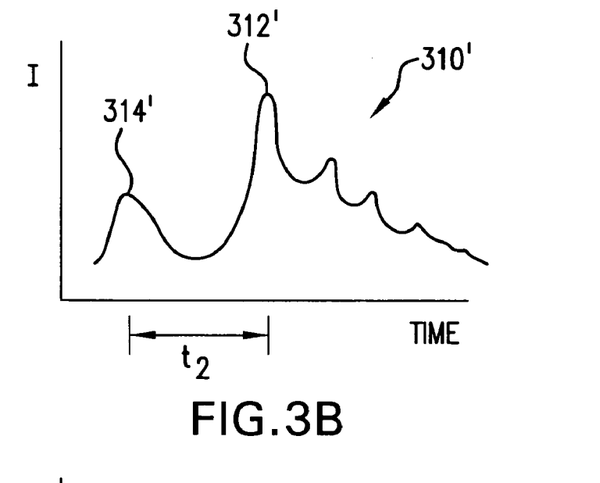
FIG. 3B illustrates another pulse shape that may be obtained using a pulse stretcher.
Figure 3C:
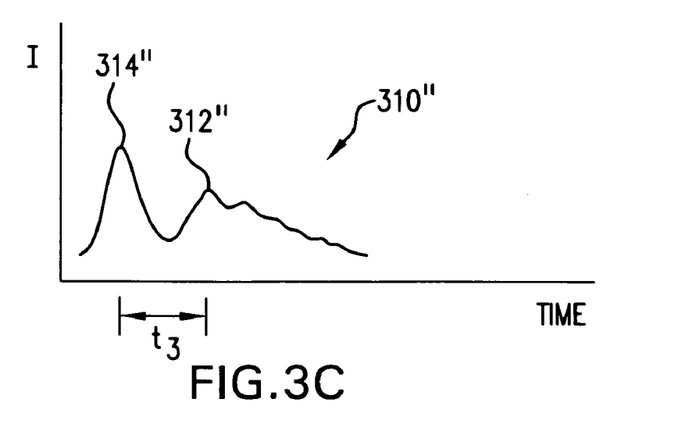
FIG. 3C illustrates yet another pulse shape that may be obtained using a pulse stretcher.

One specific pulse shape that may be optimal for some applications includes a pre-pulse peak followed by a more intense main pulse peak as illustrated in FIG. 3A and 3B. In more detail, FIG. 3A shows a shape for a pulse 310 exiting a pulse stretcher wherein the reflectivity of the beam splitter has been selected such that the second peak 312 is larger in intensity than the first peak 314, and the delay path length has been selected such that the first two peaks are separated by a time $t_1$. It is to be appreciated that a tail corresponding to the peak 312 overlaps with a tail corresponding to the peak, and thus, the two peaks are part of the same pulse. For illustrative purposes, FIG. 3B shows a shape for a pulse 310' exiting a pulse stretcher wherein the reflectivity of the beam splitter is roughly the same as the beam splitter corresponding to FIG. 3A and thus the second peak 312' is larger in intensity than the first peak 314', but a longer delay path length has been employed and now the two peaks are separated by a time $t_2$, with $t_2 > t_1$. On the other hand, FIG. 3C shows, again for illustrative purposes, a shape for a pulse 310" exiting a pulse stretcher wherein the reflectivity of the beam splitter is less than the beam splitter corresponding to FIG. 3A and thus the second peak 312" is smaller in intensity than the first peak 314". Note that the delay path length for the pulse 310" is roughly the same as the delay path length for the pulse 310 resulting in a peak separation time $t_3$, with $t_3 = t_1$. Thus, FIG. 3A illustrate that a wide range of pulse shapes may be generated by varying the beam splitter reflectivity and delay path length.

Details of the use of a pre-pulse to increase EUV power and/or conversion efficiency and/or reduce consumption/debris can be found in co-pending U.S. patent application Ser. No. 11/358,988 filed on Feb. 21, 2006, entitled LASER PRODUCED PLASMA EUV LIGHT SOURCE WITH PRE-PULSE, the entire contents of which are hereby incorporated by reference herein. In some cases, a pre-pulse peak may be used to vaporize and spatially expand the source material, e.g. tin droplet, and a subsequent main pulse used to generate an EUV emission from the expanded source material.

Depending on the magnitude of the pre-pulse peak, the source material may, in some implementations, form a weak plasma. As used herein, the term "weak plasma" and its derivatives means a material which includes ions but which is less than about 1% ionized. After a pre-selected time has elapsed after irradiation with the pre-pulse peak, the irradiated material may be exposed to a main pulse peak to create a plasma and generate an EUV emission. For example, for a CO laser source and tin droplet, a 1-10 mJ pre-pulse and 50-400 mJ main pulse may be suitable.

Figure 3D:
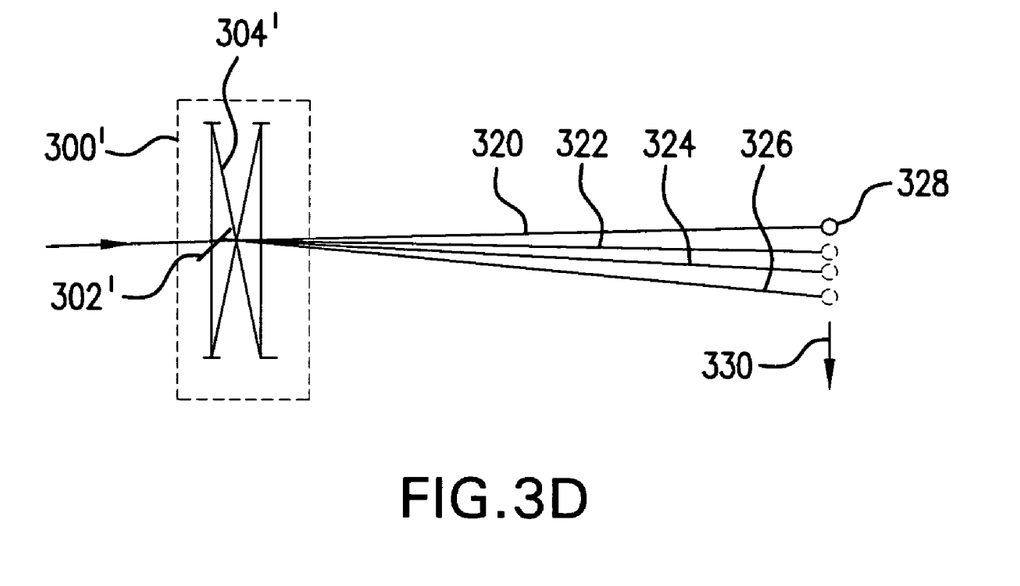
FIG. 3D illustrates a pulse stretcher having an optical alignment such that each successive pulse peak exiting the stretcher is directed along a slightly different path.

As indicated above, the components of the stretcher 300 shown in FIG. 3 can be aligned such that the pulse stretcher may be non-displacing. Alternatively, as shown in FIG. 3D, slight changes in the alignment of one or more of the optical components (i.e. the beam splitter 302' or mirrors defining the delay path 304') may be made to produce a pulse stretcher 300' such that each successive pulse peak is directed along a slightly different path. In particular, for the stretcher 300', a first pulse peak may be emitted along path 320, a second pulse peak may be emitted along path 322, a third pulse peak may be emitted along path 324, a fourth pulse peak may be emitted along path 326, and so on. With this arrangement, the sequence of pulse pulses may 'follow' a moving source material 328, e.g. droplet or pre-pulsed volume, as shown moving in direction 330.

For the structure shown in FIG. 3, the oscillator unit 200' may include a laser oscillator, e.g. a mode-locked laser oscillator, q-switched laser oscillator or other cavity dumped laser oscillator. The laser oscillator may provide pulse duration, e.g., in the range of 10-30 ns, shorter than desired, which is then increased using the pulse stretcher. For some LPP configurations, short pulse durations may limit the conversion efficiency of the EUV light source (i.e. the ratio of EUV output to source material/laser input). For some pulse amplifiers, e.g., for $CO_2$ radiation, the amplification of the long pulse is more efficient than that one for short (10 ns range) pulse due to energy exchange between rotational lines in the same vibrational band of the $CO_2$ module. Use of longer pulses may also avoid the complexity of a pre-pulse. For some LPP configurations, e.g., using tin droplets, a suitable pulse duration may be in the range of about 20-180 ns and in some cases 50-150 ns. Use of the pulse stretcher 300 may also have application for configuration in which a pre-pulse is employed with the pre-pulse either passing through or bypassing the pulse stretcher 300.

For the setup shown in FIG. 3, the temporal pulse stretcher 300 is positioned to receive laser pulses from the oscillator unit 200 and produce stretched pulses for subsequent amplification by the amplifier unit 202. This arrangement lowers the peak pulse intensity prior to the amplifier unit 202, reducing high intensity damage to the amplifier unit optics. Other arrangements are possible, e.g., the pulse stretcher may be positioned after one, some or all of the laser units in the amplification unit 202'.

Figure 4:
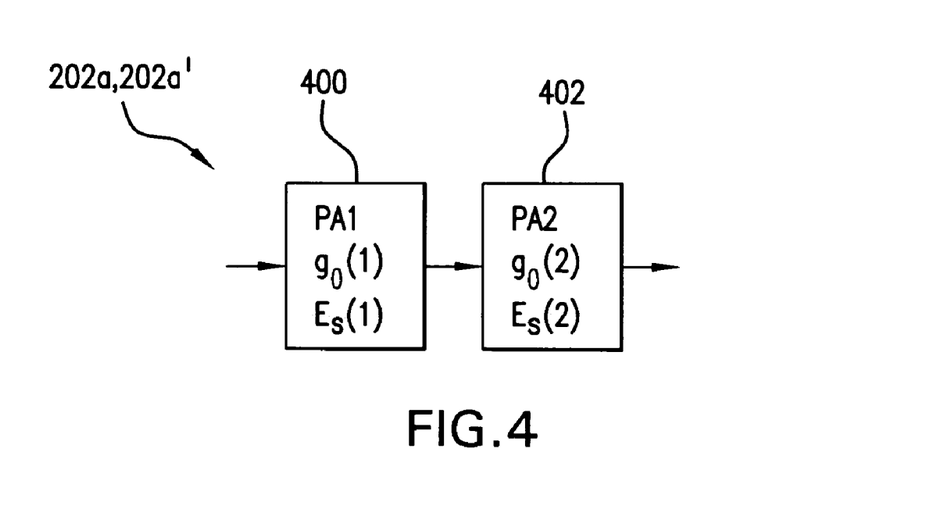
FIG. 4 illustrates an example of an amplification unit having two amplifiers arranged in series suitable for use in either of the FIG. 2 or FIG. 3 embodiments.

FIG. 4 illustrates an example of an amplification unit 202a, 202a' having two amplifiers 400, 402 arranged in series, suitable for use in either of the FIG. 2 or FIG. 3 embodiments. For the amplification unit 202a, 202a shown, amplifier 400 may have a gain medium characterized by a gain medium length ($L_1$), a saturation energy ($E_{s,\,1}$) and a small signal gain ($g_{o,\,1}$); and the amplifier 402 may have a gain medium characterized by a gain medium length ($L_2$), a saturation energy ($E_{s,\,2}$) and a small signal gain ($g_{o,\,2}$).

As used herein, the term "saturation energy" and its derivatives means the pulse energy of an input signal pulse which leads to a reduction of the gain of a gain medium to 1/e (≈37%) of its initial value.

As used herein, the term "small-signal gain" and its derivatives means the gain obtained for an input signal which is so weak that it does not cause any appreciable gain saturation of a gain medium.

Figure 5:
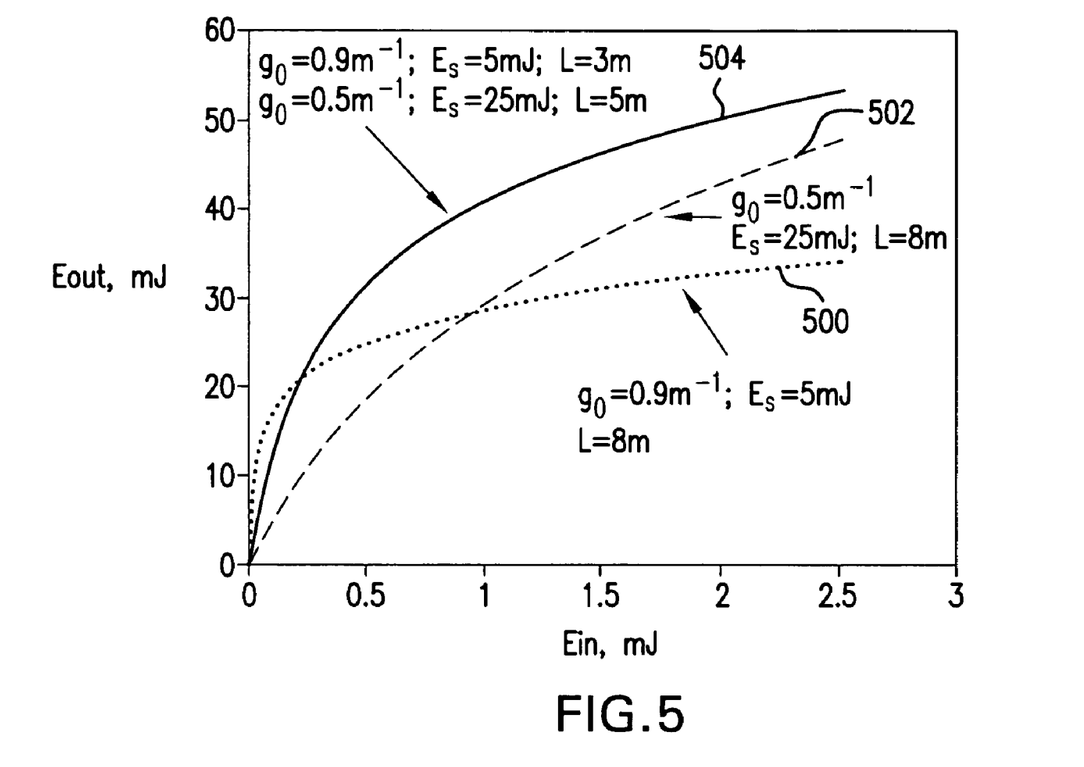
FIG. 5 shows the calculated $E_{out}$ vs. $E_{in}$ curve for an 8 meter gain medium having relatively high small signal gain and relatively low saturation energy, the calculated $E_{out}$ vs. $E_{in}$ curve for an 8 meter gain medium having relatively low small signal gain and relatively high saturation energy, and the calculated $E_{out}$ vs. $E_{in}$ curve for a series of two amplifiers of total gain medium length $L_1+L_2=8$ m with the first amplifier having a relatively high small signal gain and relatively low saturation energy and a second amplifier having a gain medium with a relatively low small signal gain and relatively high saturation energy.

As implied above, the gain media of the amplifiers 400, 402 can be configured with $(g_{o,\,1}) > (g_{o,\,2})$ and $(E_{s,\,2}) > (E_{s,\,1})$. As detailed further below, this arrangement can result in a larger amplification than a single amplifier having a gain medium length of $L_1+L_2$. This effect is illustrated by FIG. 5 which shows the $E_{in}$ vs. $E_{out}$ curve 500 for a L=8 m gain medium having relatively high small signal gain ($g_o$=0.9 m$^{-1}$) and relatively low saturation energy ($E_s$=5 mJ), the $E_{in}$ vs. $E_{out}$ curve 502 for a length L=8 m gain medium having relatively low small signal gain ($g_o$=0.5 m$^{-1}$) and relatively high saturation energy ($E_s$=25 mJ), and the $E_{in}$ vs. $E_{out}$ curve 504 for a series of two amplifiers of total gain medium length $L_1+L_2$=8 m with the first amplifier having a length L=3 m gain medium with a relatively high small signal gain ($g_o$=0.9 m$^{-1}$) and relatively low saturation energy ($E_s$=5 mJ) and a second amplifier having a length L=5 m gain medium with a relatively low small signal gain ($g_o$=0.5 m$^{-1}$) and relatively high saturation energy ($E_s$=25 mJ). The gain parameters shown are typical values for a $CO_2$ laser. It can be seen that there is a significant region (i.e. $E_{in}$>0.25 mJ) where the two amplifier configuration (curve 504) results in a higher $E_{out}$ than either of the single amplifier configurations (curves 500, 502). In particular, at $E_{in}$=1 mJ the two amplifier configuration has an output energy exceeding that for the single amplifiers with constant parameters over almost the whole length by nearly 50%. Thus, for the same gain medium length, L=8 m, the two amplifier configuration (curve 504) results in a higher $E_{out}$ than either of the single amplifier configurations (curves 500, 502).

In mathematical terms, the ratio of output energy of the PA ($E_{out}$) to the input energy ($E_{in}$) is defined by 2 parameters of the gain media: the small signal gain ($g_0$) multiplied by the media length (l) and the saturation energy ($E_s$) level. According to Frantz-Nodvic formulation, see, for example, L. M. Frantz, J. S. Nodvik: J. Appl. Phys. 34, 2346 (1963):

$$E_{out} = E_s \ln\left[1 + e^{g_0 l}\left(e^{\frac{E_{in}}{E_s}} - 1\right)\right] \quad (1)$$

For an RF, DC or pulse excited gas-discharge media such as a CO2 laser amplifier, these parameters are not independent. For example, in an RF excited gain media, high $g_0$ may be obtained using low RF pumping powers and low pressures, while to increase $E_s$ for the same media, with a corresponding reduction in $g_0$, high RF power and high gas pressure may be used. Another parameter which is not covered in the Frantz-Nodvik formulation that also has an affect on $g_0$ and $E_s$ is the gas mixture (e.g. the ratio of $CO_2:N_2:He$) of the laser medium. Thus, a number of gain medium factors may be controlled to selectively define small signal gain ($g_0$) multiplied by the media length (l) and the saturation energy ($E_s$) including RF power, gas pressure, gas composition and gas pumping speed Input beam characteristics such as pulse duration and shape and intensity distribution, e.g. Gaussian, etc., may also affect the choice of parameters, e.g., gas pressure, composition and excitation voltage necessary to obtain a selected small signal gain ($g_0$) and saturation energy ($E_s$).

For small input energies relative to the saturation energy, (i.e. $E_{in}/E_s$<<1 and $E_{in}/E_s$<<exp($g_0$*l)), formula (1) can be approximated by:

$$E_{out} \approx E_{in} e^{g_0 l} \quad (2),$$

This implies that the laser output energy for small input signals does not depend on the saturation energy but does depend exponentially on the ($g_0$l) product. The output energy is linearly proportional to the input energy. For, high input energies, when $E_{in} \sim E_s$, the dependence on $E_s$ becomes more significant. For this case the "1" in both brackets in formula (1) may be neglected and the following expression obtained:

$$E_{out} \approx E_s(g_0 l + E_{in}/E_s) \quad (3)$$

When $E_{in}/E_s$<$g_0$l, which is typically valid for long gain media, the second term in formula (3) may be neglected to obtain the expression:

$$E_{out} \approx E_s g_0 l \quad (4)$$

This expression shows that output energy reaches a saturated value which does not depend on input energy. For higher $E_{in}$ the output energy linearly varies with the input energy with some offset and with a smaller slope than for small $E_{in}$.

Figure 6:
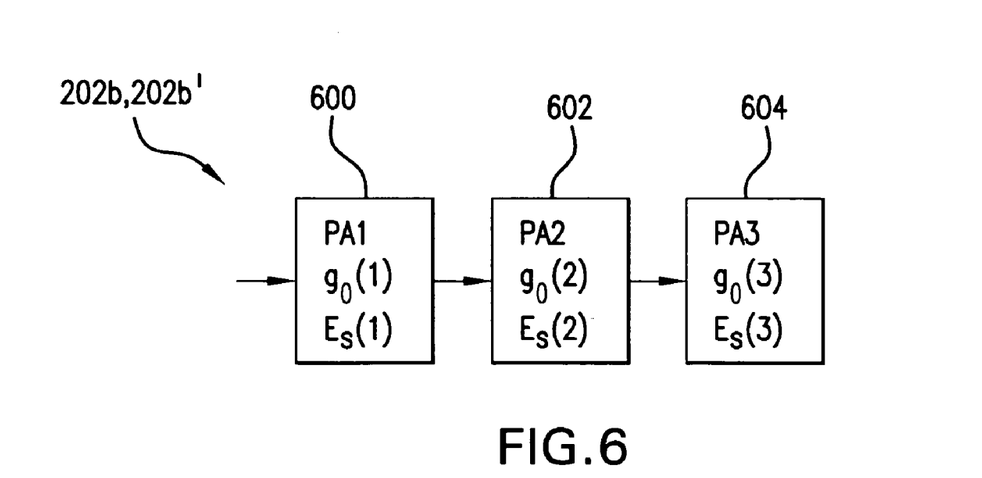
FIG. 6 illustrates an example of an amplification unit having three amplifiers arranged in series suitable for use in either of the FIG. 2 or FIG. 3 embodiments.

As shown in FIG. 6, the principles developed above may be extended to three or more amplifiers. More specifically, FIG. 6 illustrates an example of an amplification unit 202b, 202b' having three amplifiers 600, 602, 604 arranged in series, suitable for use in either of the FIG. 2 or FIG. 3 embodiments. For the amplification unit 202b, 202b' shown, amplifier 600 may have a gain medium characterized by a gain medium length ($L_1$), a saturation energy ($E_{s,\,1}$) and a small signal gain ($g_{o,\,1}$); and the amplifier 602 may have a gain medium characterized by a gain medium length ($L_2$), a saturation energy ($E_{s,\,2}$) and a small signal gain ($g_{o,\,2}$) and amplifier 604 may have a gain medium characterized by a gain medium length ($L_3$), a saturation energy ($E_{s,\,3}$) and a small signal gain ($g_{o,\,3}$), with $(g_{o,\,1}) > (g_{o,\,2}) > (g_{o,\,3})$ and $(E_{s,\,3}) > (E_{s,\,2}) > (E_{s,\,1})$. As described above, this arrangement can result in a larger amplification than a single amplifier having a gain medium length of $L_1+L_2+L_3$.

For optimization of the overall output power (or output pulse energy) at a given input energy a plurality of uniquely configured amplifiers may be used instead of single amplifier of equivalent length. In one particular implementation, the first amplifier may be configured to have maximum available $g_0$ parameter (working at low pressure and power level) whereas the final output amplifier may be configured to have maximum available $E_s$ $g_0$ l product. The intermediate segments may have gradually increasing $E_s$ parameter (from input to output) and decreasing $g_0$ parameter. Such an optimization of the $E_s$ and $g_0$ parameters between the amplifiers produces a laser with significantly higher output energy (power) than that for single amplifier of equivalent gain media length with fixed $g_0$ and $E_s$.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art.

While the particular aspects of embodiment(s) described and illustrated in this patent application in the detail required to satisfy 35 U.S.C. §112 are fully capable of attaining any above-described purposes, for problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present invention is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. § 112, sixth paragraph, unless the element is expressly recited using the phrase "means for" or, in the case of a method claim, the element is recited as a "step" instead of an "act".

We claim:

1. A laser light source comprising;
   a laser oscillator producing an output beam;
   a first amplifier amplifying said output beam to produce a first amplified beam, said first amplifier having a gain medium characterized by a saturation energy ($E_{s,1}$) and a small signal gain ($g_{o,1}$); and
   a second amplifier amplifying said first amplified beam to produce a second amplified beam, said second amplifier having a gain medium characterized by a saturation energy ($E_{s,2}$) and a small signal gain ($g_{o,2}$), with ($g_{o,1}$)>($g_{o,2}$) and ($E_{s,2}$)>($E_{s,1}$); wherein said first amplifier gain medium comprises a gas having a first gas composition and said second amplifier gain medium comprises a gas having a gas composition different from said first gas composition.

2. A laser light source as recited in claim 1 wherein said gas comprises $CO_2$.

3. A laser light source as recited in claim 1 further comprises a third amplifier amplifying said second amplified beam to produce a third amplified beam, said third amplifier having a gain medium characterized by a saturation energy ($E_{s,3}$) and a small signal gain ($g_{o,3}$), with ($g_{o,1}$)>($g_{o,2}$)>($g_{o,3}$) and ($E_{s,3}$)>($E_{s,2}$)>($E_{s,1}$).

4. A laser light source as recited in claim 1 wherein said laser oscillator is a cavity dumped laser oscillator.

5. A laser light source as recited in claim 1 wherein said laser oscillator is a mode-locked laser oscillator.

6. A laser light source as recited in claim 1 wherein said laser oscillator is a q-switched laser oscillator.

7. A laser light source as recited in claim 4 further comprising a temporal pulse stretcher.

8. A laser light source as recited in claim 7 wherein said temporal pulse stretcher is positioned to receive laser pulses from said oscillator and produce stretched pulses therefrom for amplification by said first amplifier.

9. A laser light source as recited in claim 1 wherein said first amplifier gain medium is a gas at a gas pressure $P_1$, and said second amplifier gain medium is a gas at a gas pressure $P_2$, with $P_1 \neq P_2$.

10. A laser light source comprising;
    a laser oscillator producing an output beam;
    a first amplifier amplifying said output beam to produce a first amplified beam, said first amplifier having a gain medium characterized by a saturation energy ($E_{s,1}$) and a small signal gain ($g_{o,1}$); and
    a second amplifier amplifying said first amplified beam to produce a second amplified beam, said second amplifier having a gain medium characterized by a saturation energy ($E_{s,2}$) and a small signal gain ($g_{o,2}$), with ($g_{o,1}$)>($g_{o,2}$) and ($E_{s,2}$)>($E_{s,1}$) wherein said first amplifier gain medium is a gas at a gas pressure $P_1$, and said second amplifier gain medium is a gas at a gas pressure $P_2$, with $P_1 \neq P_2$.

11. A laser light source as recited in claim 10 wherein said first amplifier gain medium comprises a gas having a first gas composition.

12. A laser light source as recited in claim 11 wherein said second amplifier gain medium comprises a gas having a gas composition different from said first gas composition.

13. A laser light source as recited in claim 11 wherein said gas comprises $CO_2$.

14. A laser light source as recited in claim 10 further comprises a third amplifier amplifying said second amplified beam to produce a third amplified beam, said third amplifier having a gain medium characterized by a saturation energy ($E_{s,3}$) and a small signal gain ($g_{o,3}$), with ($g_{o,1}$)>($g_{o,2}$)>($g_{o,3}$) and ($E_{s,3}$)>($E_{s,2}$)>($E_{s,1}$).

15. A laser light source as recited in claim 10 wherein said laser oscillator is a cavity dumped laser oscillator.

16. A laser light source as recited in claim 10 wherein said laser oscillator is a mode-locked laser oscillator.

17. A laser light source as recited in claim 10 wherein said laser oscillator is a q-switched laser oscillator.

18. A laser light source as recited in claim 15 further comprising a temporal pulse stretcher.

19. A laser light source as recited in claim 18 wherein said temporal pulse stretcher is positioned to receive laser pulses from said oscillator and produce stretched pulses therefrom for amplification by said first amplifier.

* * * * *